A. ROBERTSON.
Improvement in Butter-Pails, &c.
No. 114,714. Patented May 9, 1871.
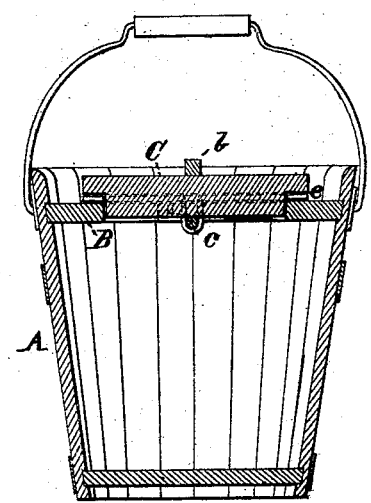
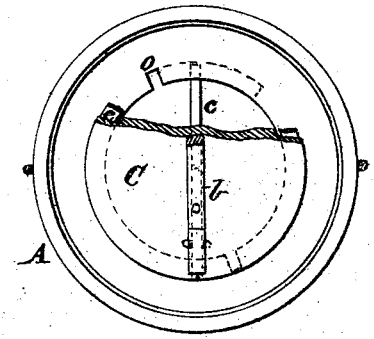
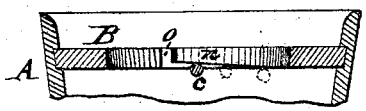

United States Patent Office.

ARCHIE ROBERTSON, OF EAST RUPERT, VERMONT.

Letters Patent No. 114,714, dated May 9, 1871.

IMPROVEMENT IN BUTTER-PAILS, &c.

The Schedule referred to in these Letters Patent and making part of the same.

*To all whom it may concern:*

Be it known that I, ARCHIE ROBERTSON, of East Rupert, in the county of Bennington and State of Vermont, have invented certain new and useful Improvements in Packing Pails for Butter, &c.; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use my invention, I will proceed to describe it.

My invention relates to vessels or packages for containing butter, lard, and similar articles; and The invention consists in providing the vessel with a cover that will close it air-tight, and that can be attached and detached at will, as hereinafter more fully explained.

Figure 1 is a transverse vertical section with the cover on.

Figure 2 is a top plan view with a portion of the cover broken away.

Figure 3 is a vertical section of a portion with the cover removed.

In constructing my device I make the body A in the style of an ordinary wooden pail or bucket, with a bail for convenience in handling it.

Near the top I cut a groove, in which I secure an annular rim or top, B.

In the inner edge of this top B I cut two notches, $o$, directly opposite each other, as represented in fig. 2, and on the under face of the top I bevel it from these notches $o$ around for some distance, as represented at $n$, fig. 3, and as indicated by dotted lines in fig. 2.

I then provide a cover, C, somewhat greater in diameter than the opening in the top B, with a portion of its lower part turned off so as to fit into the opening, as represented in fig. 1.

Across the under side of this cover C I secure a rod, $c$, with its ends protruding slightly beyond its under face, as shown in figs. 1 and 2.

Across its top I secure a cleat, $b$, which serves to keep the cover from warping, and also to turn it by, and to handle it in applying it to or removing it from the vessel.

I also provide a packing-ring, $e$, of proper size to fit under the flange of the cover and between it and the top B, as shown in figs. 1 and 2. This ring may be made of sheet-rubber, or of cloth saturated with paraffine; the latter being preferable for butter on account of its inodorous qualities, and therefore less likely to affect the taste of the butter.

In using the package the vessel is first filled, the packing-ring then laid on, and the cover so applied that the projecting ends of the rod $c$ will enter the notches $o$, when, by turning the cover around, the inclines $n$, acting on the rod $c$, will draw the cover down tight upon the packing and thus effectually close the vessel.

To remove the cover it is simply turned back until the ends of rod $c$ are opposite the notches $o$, when it can be at once lifted off.

By these means I produce a package in which butter, lard, and similar products can be preserved and transported in the most effectual manner.

Having thus described my invention,

What I claim is—

An improved package for butter and similar articles, consisting of the vessel A having the annular top B, provided with the notches $o$ and inclines $n$, and the cover C provided with the rod $c$, all constructed and arranged to operate as herein set forth.

ARCHIE ROBERTSON.

Witnesses:
S. F. HOLLEY,
ELIZA M. HOLLEY